United States Patent
Tang et al.

(10) Patent No.: US 6,779,337 B2
(45) Date of Patent: Aug. 24, 2004

(54) HYDROGEN FUELED SPARK IGNITION ENGINE

(75) Inventors: Xiaoguo Tang, Canton, MI (US); Joseph Robert Theis, Rockwood, MI (US); Robert Jay Natkin, Canton, MI (US); Siamak Hashemi, Farmington Hills, MI (US); William F. Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,143

(22) Filed: Sep. 20, 2002

(65) Prior Publication Data

US 2004/0055281 A1 Mar. 25, 2004

(51) Int. Cl.[7] ................................................ F01N 3/00
(52) U.S. Cl. .......................... 60/278; 60/285; 60/297; 123/3; 123/DIG. 12; 123/568.19
(58) Field of Search .......................... 60/274, 285, 278, 60/295, 297; 123/3, DIG. 12, 568.11, 568.18, 568.19, 1 A

(56) References Cited

U.S. PATENT DOCUMENTS

| | | | |
|---|---|---|---|
| 4,230,072 A | * 10/1980 | Noguchi et al. | ............ 123/1 A |
| 5,272,871 A | * 12/1993 | Oshima et al. | ................ 60/274 |
| 5,412,946 A | 5/1995 | Oshima et al. | |
| 5,520,161 A | * 5/1996 | Klopp | ........................ 123/676 |
| 5,524,432 A | * 6/1996 | Hansel | ........................ 60/274 |
| 5,787,864 A | * 8/1998 | Collier et al. | ................ 123/492 |
| 6,109,024 A | 8/2000 | Kinugasa et al. | |
| 6,122,909 A | * 9/2000 | Murphy et al. | ................ 60/286 |
| 6,192,675 B1 | 2/2001 | Hirota et al. | |
| 6,276,132 B1 | 8/2001 | Kanesaka et al. | |
| 6,308,515 B1 | 10/2001 | Bidner et al. | |
| 6,311,480 B1 | 11/2001 | Suzuki et al. | |
| 6,405,720 B1 | * 6/2002 | Collier, Jr. | ............. 123/568.12 |

\* cited by examiner

*Primary Examiner*—Binh Q. Tran

(57) ABSTRACT

A hydrogen fueled reciprocating spark ignition engine includes a fuel system for providing gaseous hydrogen to the cylinders of the engine and a lean NOx trap coupled to the engine for treating the engine's exhaust. An EGR system provides recirculated exhaust gas to the engine, and a controller operates the fuel system and EGR system during periodic purging of the lean NOx trap such that the engine is operated fuel rich, with the mass of EGR approximating 40%–80% of the mass of air and fuel.

15 Claims, 4 Drawing Sheets

HYDROGEN FUELED SPARK IGNITION ENGINE

BACKGROUND OF INVENTION

1. Field of the Invention

The present invention relates to a reciprocating, spark-ignited internal combustion engine operating on gaseous hydrogen.

2. Disclosure Information

Hydrogen has long been recognized as an engine fuel offering interesting possibilities. On the one hand, hydrogen combustion produces very few hydrocarbons (HC), carbon monoxide (CO), and carbon dioxide (CO2) because there is no carbon in the fuel. Rather, carbonaceous exhaust constituents arise from small amounts of lubricating oil participating in the combustion event. Hydrogen is thus a desirable fuel from an exhaust emissions standpoint. Because of its combustion characteristics, in particular its extremely lean flammability limit, it is possible to operate a hydrogen fuel engine at extremely fuel lean air/fuel ratios. For the purposes of this specification, discussion will be made of equivalence ratio, Ø which in common automotive parlance means the ratio of the stoichiometric air/fuel ratio to the actual air/fuel ratio. Accordingly, values of Ø equivalence ratio less than one correspond to lean air/fuel ratios, and equivalence ratios greater than one correspond to rich air/fuel ratios. With a system according to present invention, purging of an NOx trap will at rich air/fuel ratios (i.e. e. Ø) regardless of engine speed and load.

A problem with the use of hydrogen as a motor fuel arises due to the high flame speed of hydrogen. Although the stoichiometric air/fuel ratio for hydrogen is about 34.2:1, in the absence of recirculated exhaust gas (EGR), most engines cannot be run at at Ø i.e.,stoichiometric air/fuel ratio) because of problems with auto ignition. Simply stated, auto ignition is the tendency for the mixture within the combustion chamber to self-ignite prior to the arrival of the flame front propagating through the mixture as a result of the spark ignition. Because of concerns related to auto ignition, engines fueled with hydrogen have been required to run at extreme fuel lean conditions (air/fuel ratio of about 65:1) in order to prevent auto ignition and to provide stable combustion. However, if high levels of EGR are used, an engine may be able to operate at at Ø albeit with a concomitant loss of fuel economy. Accordingly, it is desirable to operate at at Ø in order to maximize fuel economy. Another problem associated with known hydrogen fuel engines arises from the need to maintain compression ratio at relatively lower values in order to avoid the previously described auto ignition. In one engine which has been the subject of published research, the engine was operated with hydrogen at a compression ratio of about 10:1. The present inventors, have determined, however, that it is possible to operate an engine on hydrogen at 14:1–15:1 compression ratio, provided the engine is controlled according to the present specification and claims.

SUMMARY OF INVENTION

A hydrogen fueled reciprocating spark ignition engine includes a fuel system for providing gaseous hydrogen to the engine's cylinders, and a lean NOx trap coupled to the engine for treating the engine's exhaust. An EGR system provides recirculated exhaust gas to the engine's intake, and a controller operates the fuel system and the EGR system during periodic purging of the lean NOx trap such that the engine is operated at or near a stoichiometric air/fuel ratio, with the mass of EGR approximating the mass of air and fuel. The fuel system and the EGR system may be operated by the controller to purge the lean NOx trap on either a timed basis or by integrating the output of a NOx sensor mounted within an exhaust system of the vehicle or engine.

If a timed basis is used to schedule purge operation, the EGR system and fuel system may be operated to purge the lean NOx trap for about 3–5%, for example, of the engine's operating time.

According to another aspect of the present invention, a hydrogen fueled reciprocating spark ignition engine may have a fuel system and an EGR system controlled during operation at or near maximum load so as to achieve an air/fuel ratio and EGR rate which are comparable to the air/fuel and EGR rate utilized during purging of a lean NOx trap mounted in the engine's exhaust system.

According to another aspect of the present invention, the present hydrogen fueled reciprocating spark ignition engine may further comprise a three way catalyst mounted either upstream or downstream of the lean NOx trap. In the event that additional reductant is needed during purging because an engine having a system and being operated according to the present invention cannot tolerate sufficient hydrogen to produce needed reductant in the exhaust, the engine may further comprise an auxiliary fuel system for providing hydrogen to the engine's exhaust system upstream of the lean NOx trap.

An engine according to the present invention may be operated at an equivalence ratio of about 0.15 to about 0.65, except when the lean NOx trap is being purged, in which case the equivalence ratio will be greater than 1.0 with heavy EGR to avoid pre-ignition. In this case, the EGR mass flow rate will be about 40%–80% of the total mass flow entering the engine's combustion chambers.

According to another aspect of the present invention, a method for operating a reciprocating internal combustion engine equipped with a lean NOx trap and burning gaseous hydrogen, includes the steps of operating the engine at an equivalence ratio of about 0.15 to 0.65, with the precise equivalence ratio being a function of engine speed and load. When purging a lean NOx trap, the equivalence ratio will be set at about 1.1. The present method may further include the step of operating the engine with the mass of EGR being approximately equal to the mass of air and fuel when the lean NOx trap is being purged. The present method may further comprise the step of operating the engine with the mass of EGR being approximately equal to the mass of air and fuel when the lean NOx trap is being purged and when the engine is operating at or near maximum load.

It is an advantage of a system and method according to present invention that hydrogen fuel may be used so as to exploit hydrogen's best characteristics by operating extremely lean to achieve maximum fuel economy except when regeneration of the lean NOx trap is required, wherein the engine may be operated at a richer-than-stoichiometric air/fuel ratio with heavy EGR, which causes a reducing atmosphere had to be present at the front face of a lean NOx trap, so as to allow excellent regeneration of the lean NOx trap.

It is another advantage of the present invention that an engine operating according to the present system and method may utilize higher compression ratios than those typically found with hydrogen fueled engines. In an engine operated according to the present invention, the hydrogen and air are mixed with a high percentage of recirculated exhaust gas, in the range of 40–80%, by weight. These exhaust gases help to prevent the autoignition of the hydrogen and air. In effect, the exhaust gases are a diluent which does not participate in the combustion reactions to produce an exotherm; instead, the exhaust gases absorb combustion energy and cause the peak temperature of the burned gas mixture to be lower. Additionally, the exhaust gases contain water, which interferes with the chain reactions leading to autoignition.

It is yet another advantage of the present invention that an engine operating according to the current system and method maybe operated without the need for aftertreatment other than a NOx trap.

Other advantages, as well as objects and features of the present invention, will become apparent to the reader of this specification.

DETAILED DESCRIPTION

Figure 1:
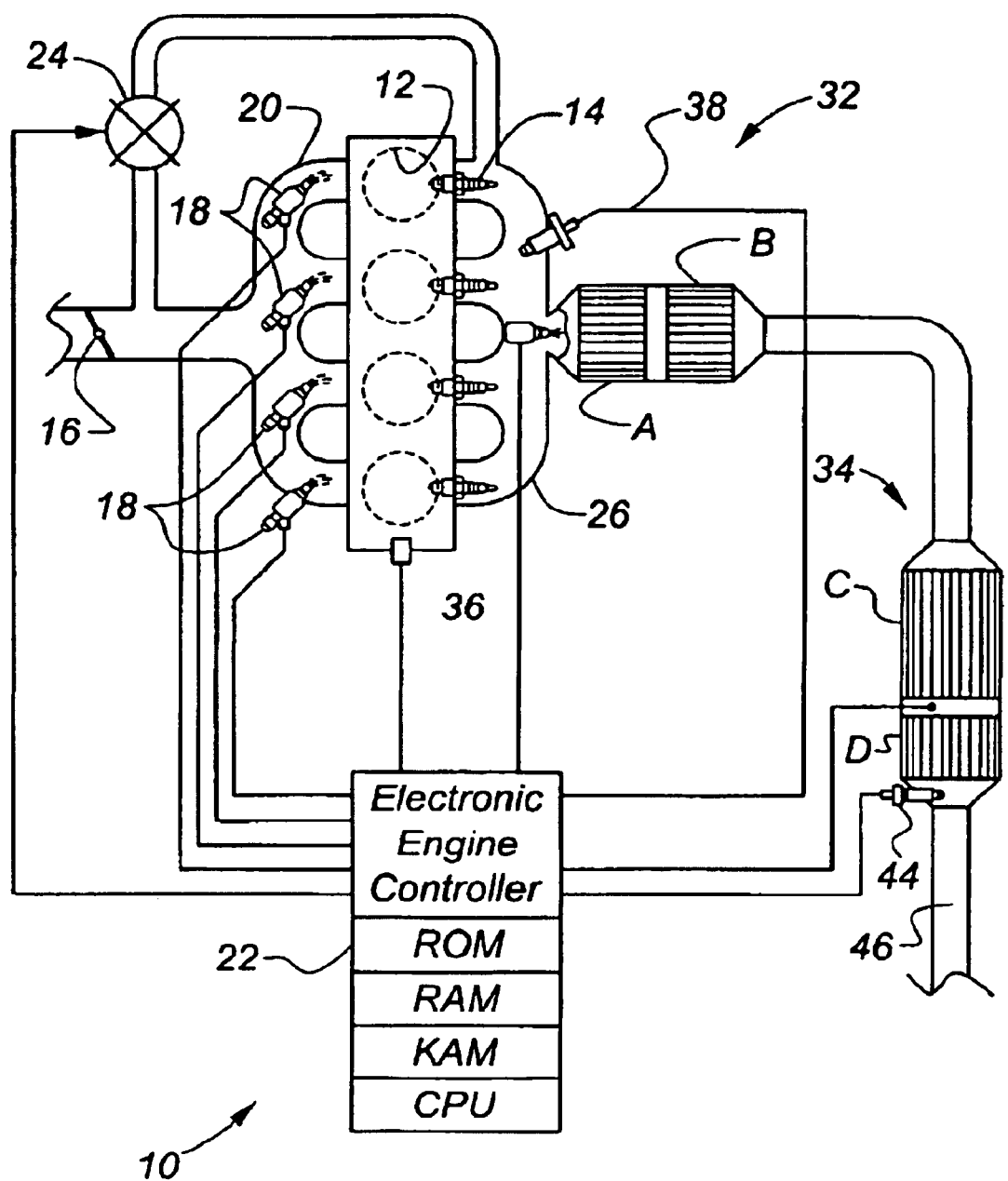
FIG. 1 is a schematic representation of spark-ignited hydrogen fuel engine according to the present invention.

As shown in FIG. 1, engine 10 has a plurality of cylinders 12 which are serviced by a plurality of spark plugs 14. A plurality of fuel injectors 18 provides gaseous hydrogen to cylinders 12, with the fuel being mixed with air and EGR admitted by throttle plate 16 and EGR valve 24 respectively. EGR valve 24, fuel injectors 18, and preferably, throttle plate 16 are all operated by electronic engine controller 22. Controller 22, which is drawn from the class of engine controllers known to those skilled in the art and suggested by this disclosure, generally has a processor (CPU), input/output ports, an electronic storage medium containing processor executable instructions and calibration values, read only memory, random acccess memory, and keep-alive memory. Controller 22 receives signals from a plurality of sensors 36 coupled to engine 10, and controls the spark timing of spark plugs 14, the fuel supplied by injectors 18, the EGR flow controlled by valve 24 and the engine airflow controlled by throttle plate 16. In one embodiment, electronic engine control 22 also provides additional fuel to the engine exhaust system, if needed via auxiliary fuel injector 26. The inventors of the present invention have determined that some are unable to tolerate sufficient hydrogen fuel, delivered to the combustion chamber, so as to allow a proper level of reductant to be present in the engine exhaust, and as a result, with such engines it is necessary to provide hydrogen directly to the exhaust system. Injector 26 fulfils this need.

Electronic engine controller 22 receives further signals from exhaust oxygen sensor 38, and exhaust NOx sensor 44, which measures the concentration of NOx in tailpipe 46. The catalytic aftertreatment system of the present invention includes a first aftertreatment device 32 and a second aftertreatment device 34. First aftertreatment device 32 may include a three-way catalyst (TWC) at location "A", followed by a lean NOx trap at location "B". Alternatively, first aftertreatment device 32 may comprise two lean NOx traps at locations A and B, or a single lean NOx trap. As yet another alternative, first aftertreatment device 32 may include a TWC mounted downstream of a lean NOx trap. It is important to note here that in any event, first aftertreatment device 32 includes at least one lean NOx trap, which is itself a type of three-way catalyst.

Second aftertreatment device 34 is optional and may comprise a selective catalytic reduction (SCR) converter, which is intended to collect any ammonia which may be formed during the purging of an upstream NOx trap. During operation at lean air/fuel ratios (o ($\phi$ following purging of the NOx trap, ammonia stored within the SCR may be employed to reduce NOx that is not stored by the NOx trap.

Figure 2:
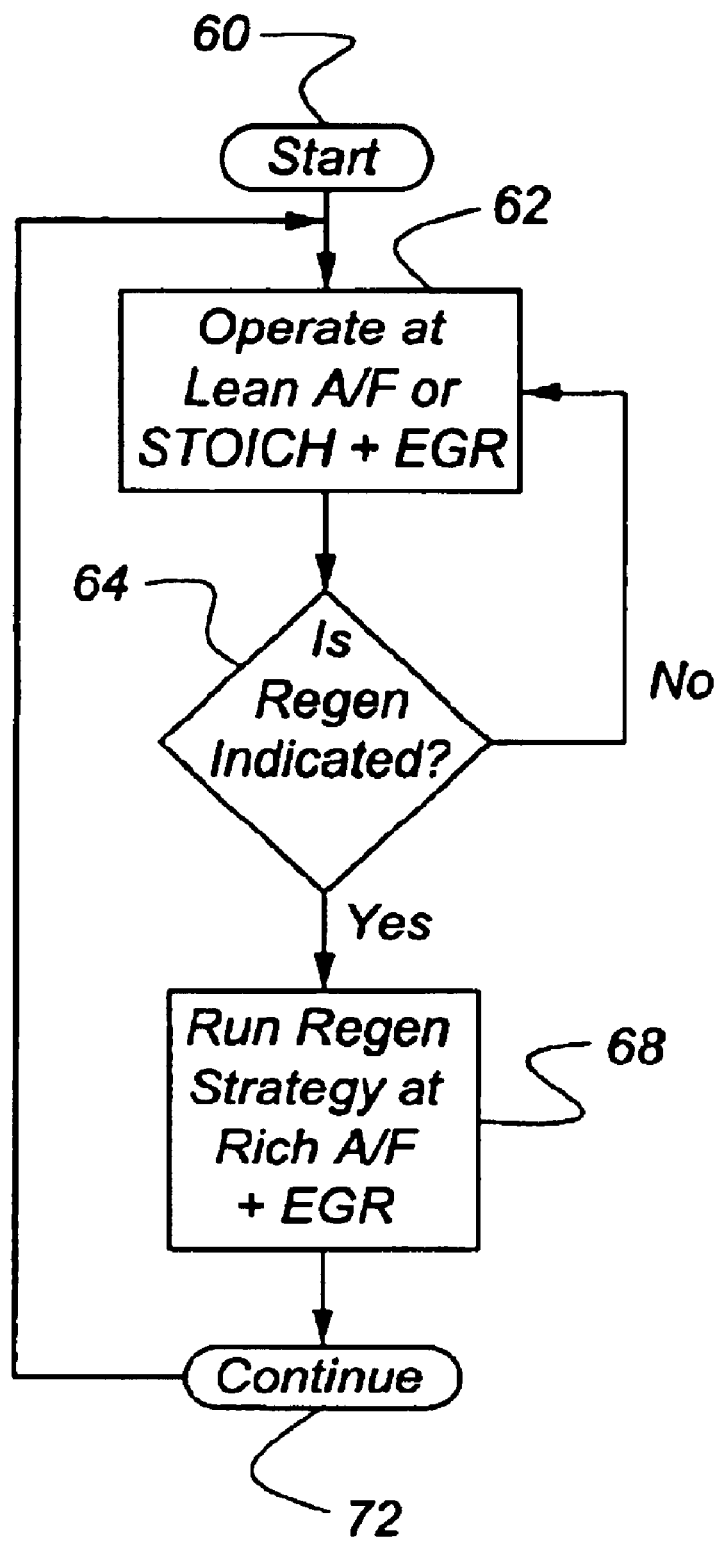
FIG. 2 is a flow diagram describing a lean NOx trap regeneration method according to the present invention.

FIG. 2 illustrates a method of operating a hydrogen fueled spark-ignited engine according to the present invention. Beginning with block 60, engine controller 22 moves to block 62, wherein operation is begun at either a lean air/fuel ratio or with a stoichiometric air/fuel ratio (io ($\phi$ plus EGR. It is envisioned that regardless of the strategy employed, some of the engine's operating time will be spent at extremely lean air/fuel ratios corresponding to an equivalence ratio of 0.15 to 0.65. If on the other hand, operation is desired at or near maximum load, which is defined herein as operation wherein throttle 16 is opened and EGR valve 24 is opened to an extent that the pressure within intake manifold 20 approaches ambient air pressure, engine 10 will be operated so as to achieve an air/fuel ratio and EGR rate which are comparable to the value of of $\phi$ EGR rate used during regeneration of a lean NOx trap utilized in first after-treatment device 32. Such a strategy is illustrated in FIG. 3, in which equivalence ratio is controlled as a function of engine speed and load, with the air/fuel mixture being richened to about out $\phi$t maximum load.

Figure 3:
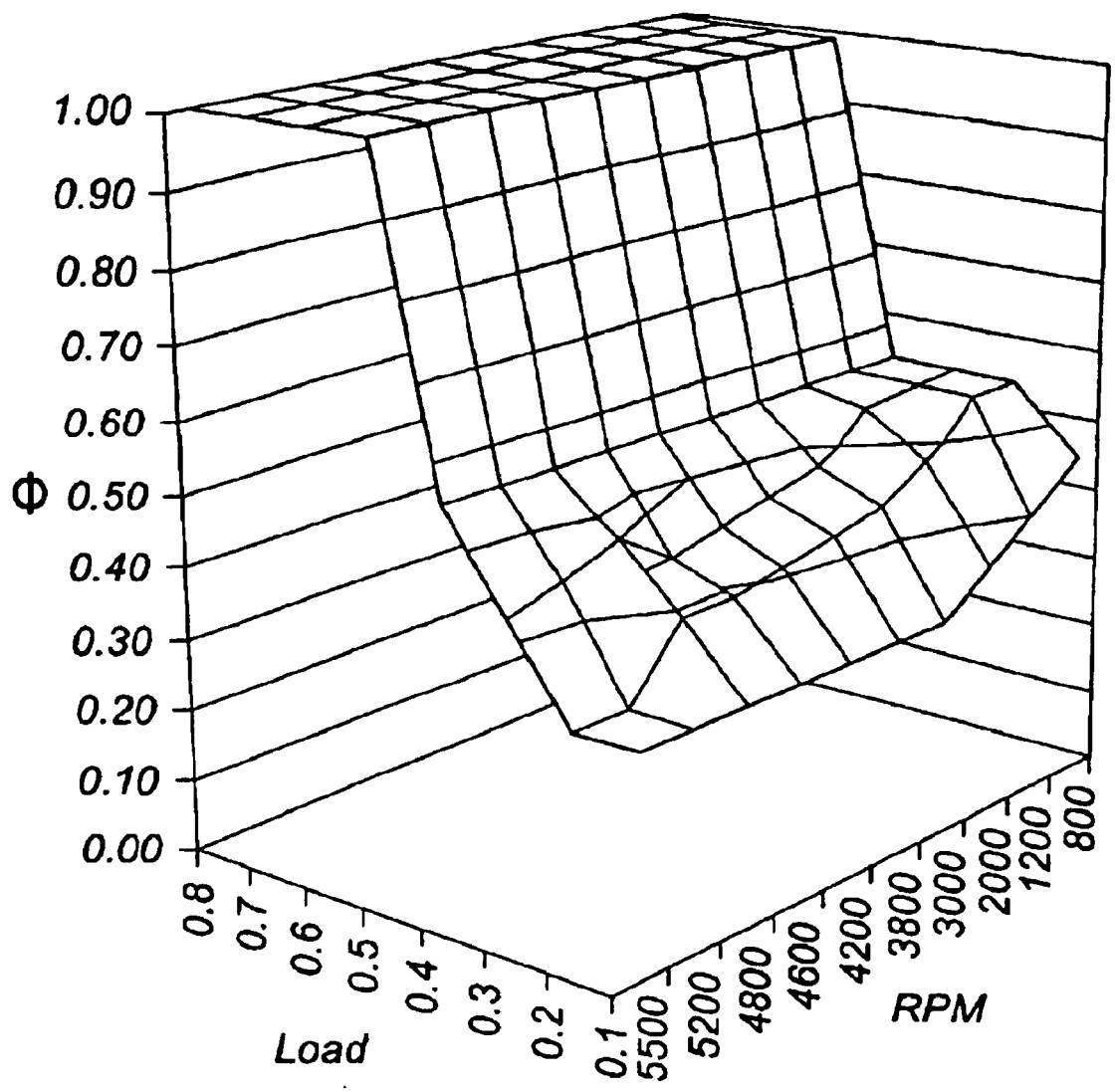
FIG. 3 is a first three dimensional plot showing equivalence ratio as a function of engine speed and load, for a spark-ignited hydrogen fueled engine according to an aspect of the present invention.

During both purging of the lean NOx trap and operation at maximum load according to the strategy illustrated in FIG. 3, the amounts of EGR used generally lie in the range of 40%–80% of the mass fraction within the combustion chamber. In other words approximately half of the mass fraction contained within the combustion chamber is recirculated exhaust gas. This heavy use of EGR is necessary to avoid autoignition, as described earlier in this specification.

Figure 4:
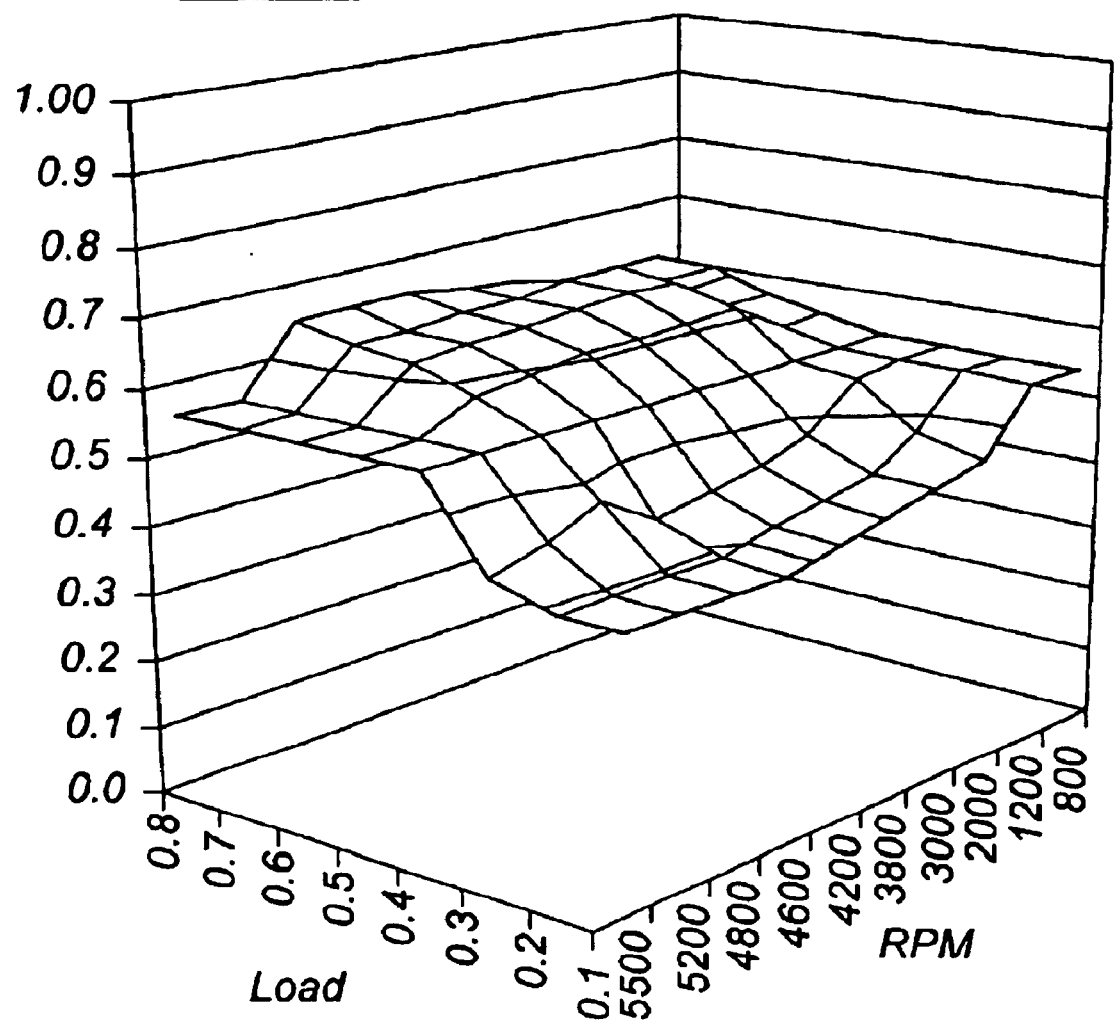
FIG. 4 is a second three dimensional plot showing equivalence ratio as a function of engine speed and load, for a spark-ignited hydrogen fueled engine according to an aspect of the present invention.

FIG. 4 illustrates an operating strategy according to the present invention in which the equivalence ratio is maintained below 0.70 during normal operation. As with the strategy illustrated in FIG. 3, however, er, $\phi$ ncreased above unity during purging of the lean NOx trap.

Continuing now with a description of the strategy shown in FIG. 2, at block 64 electronic engine controller 22 asks the question as to whether regeneration is indicated. The need to regenerate, or purge, the lean NOx trap may be determined by modeling, including, for example, keeping track of the fuel flow through the engine, the operating load, and/or the time the engine has been operating. Those skilled in the art will appreciate in view of this disclosure that the modeling approach may be supported by recording values for the load the engine has been operated under and by considering other engine operating parameters known to those skilled in the art and suggested by this disclosure. Alternatively, NOx sensor 44 may be employed along with an integration scheme to determine when the LNT within first after-treatment device 32 needs to be regenerated. This regeneration should take about 3–5% of the operating time of the engine in a vehicle subjected to a typical city-suburban duty cycle.

If the answer to the question posed in block 64 is yes, electronic engine controller 22 begins to run the regen strategy by causing the engine to run at a rich air/fuel ratio and with heavy EGR which is noted as approaching 40–80% of the mass fraction contained within the combustion chamber. Thereafter, the routine continues at block 72. The precise percentage of EGR will be determined through the use of either dynamometer testing, or through modeling, or through a combination of the two techniques.

The inventors of the present invention have determined that it is preferable to over-fuel engines with hydrogen rather than to inject hydrogen into the exhaust system downstream of the engine in order to achieve the rich air/fuel ratio needed for purging the LNT, because direct injection of hydrogen may produce a very large exotherm which could result in an inability of the lean NOx trap to operate within its best window of efficiency.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed is:

1. A hydrogen fueled reciprocating spark ignition engine, comprising:

a fuel system for providing gaseous hydrogen to the cylinders of the engine;

a lean NOx trap coupled to the engine for treating the engine's exhaust;

an EGR system for providing recirculated exhaust gas to the engine; and a controller for operating the fuel system and the EGR system during periodic purging of the lean NOx trap such that the engine is operated at a richer-than-stoichiometric air/fuel ratio, and with the mass of EGR approximating 40–80% of the mass of air and fuel.

2. A hydrogen fueled reciprocating spark ignition engine according to claim 1, wherein the fuel system and the EGR system are operated by the controller to purge the lean NOx trap on a timed basis.

3. A hydrogen fueled reciprocating spark ignition engine according to claim 1, wherein the fuel system and the EGR system are operated by the controller to purge the lean NOx trap when a model run by the controller indicates that the lean NOx trap should be purged.

4. A hydrogen fueled reciprocating spark ignition engine according to claim 2, wherein the fuel system and the EGR system are operated to purge the lean NOx trap for about 3–5% of the engine's operating time.

5. A hydrogen fueled reciprocating spark ignition engine according to claim 1, wherein the compression ratio of the engine is greater than 10:1.

6. A hydrogen fueled reciprocating spark ignition engine according to claim 1, wherein the compression ratio of the engine is within the range of approximately 14:1–15:1.

7. A hydrogen fueled reciprocating spark ignition engine according to claim 1, wherein the fuel system and the EGR system are controlled during operation at or near maximum load so as to achieve an air/fuel ratio and EGR rate which are comparable to the air/fuel and EGR rate utilized during purging of the lean NOx trap.

8. A hydrogen fueled reciprocating spark ignition engine according to claim 1, further comprising a three way catalyst mounted upstream of the lean NOx trap.

9. A hydrogen fueled reciprocating spark ignition engine according to claim 1, further comprising an NOx sensor mounted downstream from the lean NOx trap, with said sensor generating a signal corresponding to the concentration of NOx in the exhaust stream, and with said sensor being operatively connected with said controller.

10. A hydrogen fueled reciprocating spark ignition engine according to claim 1, further comprising an SCR converter mounted downstream from the lean NOx catalyst.

11. A hydrogen fueled reciprocating spark ignition engine according to claim 1, further comprising an auxiliary fuel system for providing hydrogen to the engine's exhaust system upstream of the lean NOx trap.

12. A hydrogen fueled reciprocating spark ignition engine according to claim 1, wherein the engine is operated at an equivalence ratio of about 0.15 to 0.65, except when the lean NOx trap is being purged.

13. A hydrogen fueled reciprocating spark ignition engine according to claim 1, wherein the engine is operated at an equivalence ratio of about 0.15 to 0.65, excepting when the lean NOx trap is being purged and when the engine is being operated at or near maximum load.

14. A hydrogen fueled reciprocating spark ignition engine according to claim 1, further comprising a three-way catalyst mounted downstream from the lean NOx catalyst.

15. A hydrogen fueled reciprocating spark ignition engine according to claim 1, wherein the mass flow of EGR is approximately equal to the mass of air and fuel.

* * * * *